Figure 1:
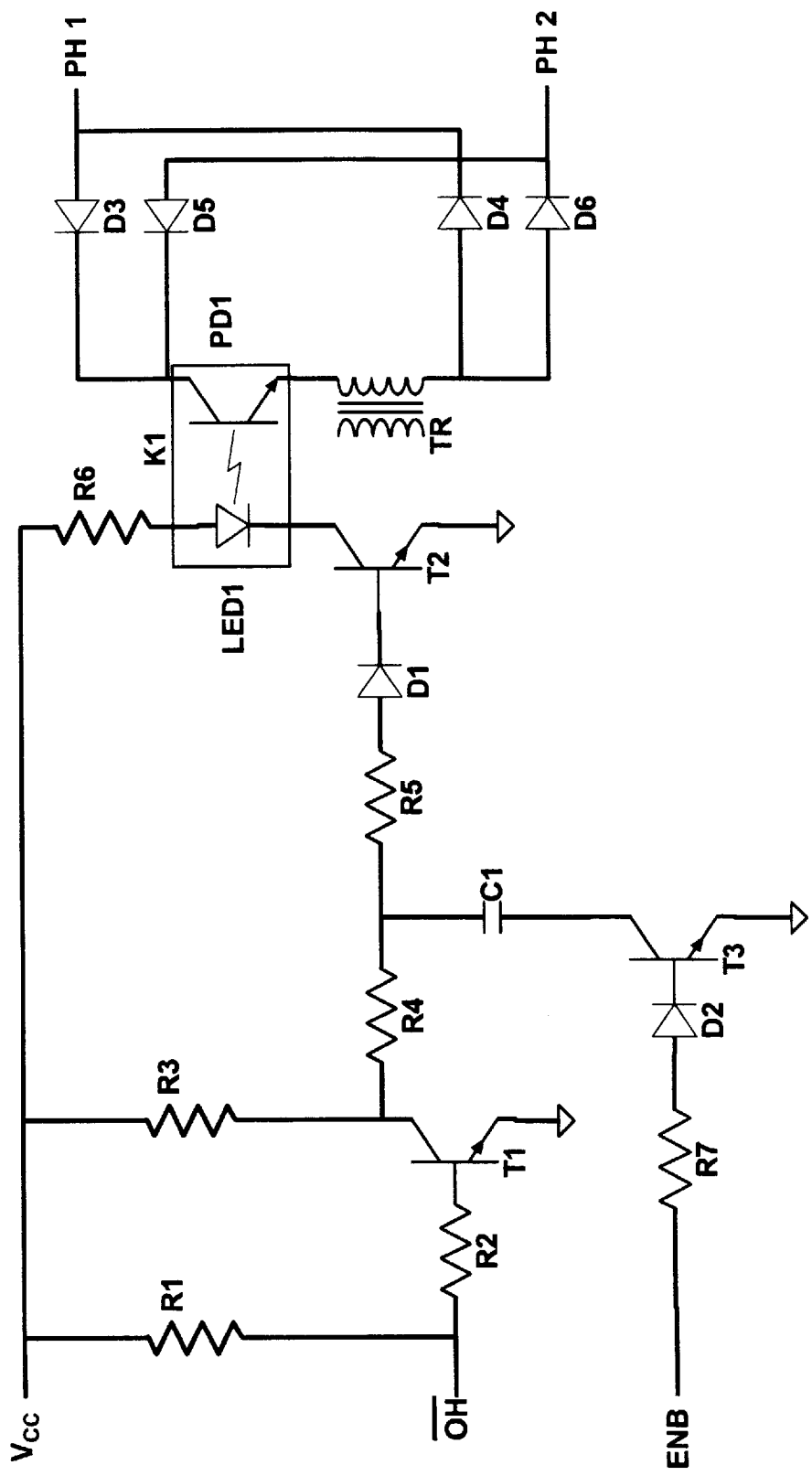

United States Patent
Pitsch et al.

[11] Patent Number: 5,859,906
[45] Date of Patent: Jan. 12, 1999

[54] TELEPHONE SWITCH HOOK INTERFACE CIRCUIT

[75] Inventors: Robert Alan Pitsch; James Edwin Hailey, both of Indianapolis, Ind.

[73] Assignee: Thomson Consumer Electronics, Inc., Indianapolis, Ind.

[21] Appl. No.: 752,298

[22] Filed: Nov. 19, 1996

[51] Int. Cl.$^6$ .......................... H04M 1/00; H04M 11/00
[52] U.S. Cl. .......................... 379/399; 379/377; 379/378; 379/382; 379/93.05; 379/106.08; 379/93.28
[58] Field of Search ...................... 379/377, 382, 379/424, 413, 399, 93.05, 93.06, 93.09, 93.11, 106.04, 106.08, 378, 32, 35, 93.28

[56] References Cited

U.S. PATENT DOCUMENTS

| | | | |
|---|---|---|---|
| 3,969,591 | 7/1976 | Sekiguchi | 379/387 |
| 4,315,106 | 2/1982 | Chea, Jr. | 379/377 |
| 4,317,964 | 3/1982 | Biggs et al. | 379/379 |
| 4,435,622 | 3/1984 | Grantland et al. | 379/393 |
| 4,451,703 | 5/1984 | Brightman et al. | 379/385 |
| 4,578,533 | 3/1986 | Pierce | 379/93.31 |
| 4,598,173 | 7/1986 | Chea, Jr. et al. | 379/339 |
| 4,958,371 | 9/1990 | Damoci et al. | 379/377 |
| 5,291,545 | 3/1994 | Stahl | 379/98 |
| 5,422,939 | 6/1995 | Kramer et al. | 379/107 |
| 5,428,662 | 6/1995 | Hamilton | 379/24 |
| 5,448,636 | 9/1995 | Andreini et al. | 379/422 |
| 5,619,567 | 4/1997 | Apfel | 379/413 |
| 5,696,810 | 12/1997 | Dunn | 379/32 |
| 5,706,342 | 1/1998 | Baeder et al. | 379/382 |
| 5,768,365 | 6/1998 | Kurdziel | 379/377 |

*Primary Examiner*—Daniel S. Hunter
*Assistant Examiner*—Charles N. Appiah
*Attorney, Agent, or Firm*—Joseph S. Tripoli; Peter M. Emanuel; Robert D. Shedd

[57] ABSTRACT

A switch hook interface circuit couples a subscriber telephone to a subscriber telephone line. This interface circuit comprises a source of an off-hook signal, having one state indicating an off-hook condition, and a second state indicating an on-hook condition. A circuit is coupled between the off-hook signal source and the subscriber telephone line which gradually increases the current drawn from the subscriber telephone line when the off-hook signal indicates an off-hook condition, and gradually decreases the current drawn from the subscriber telephone line when the off-hook signal indicates an on-hook condition.

13 Claims, 1 Drawing Sheet

TELEPHONE SWITCH HOOK INTERFACE CIRCUIT

The present invention relates to a circuit for controlling the rate of change of current drawn when going off-hook and on-hook in a telephone switch hook interface circuit.

Present consumer electronic equipment, for example direct satellite reception systems (e.g. DSS systems), sometimes require access to the subscribers telephone line. This access may be to report billing information to the service provider, or for the viewer to interact with a central computer system during access to interactive television programs. To do this, a computer modem accesses the viewer's telephone line in a known manner.

However, such automated systems cannot know if a person is already using the subscriber telephone line. To determine whether the telephone line is free, prior art modem systems went off-hook, and attempted to detect a dial tone. If a dial tone is detected, this indicates that the modem is alone on the telephone line, and dialing and connection to the central computer may commence. On the other hand, if the modem does not detect a dial tone, it is not alone on the telephone line, and the modem can hang up and try again at a later time.

Prior art modems went off-hook in the same manner as standard telephones, e.g. by activating a relay. This causes an audible click on the telephone line when the relay goes off-hook, and another click when it goes on-hook after determining that it is not alone on the telephone line. These clicks are highly audible and annoying to a subscriber who is using the telephone line at that time. It is desirable to minimize the audibility of an automatically controlled modem when it goes off-hook to test whether the telephone line is available for its use.

In accordance with principles of the present invention, a switch hook interface circuit couples to a subscriber telephone line. This interface circuit comprises a source of an off-hook signal, having one state indicating an off-hook condition, and a second state indicating an on-hook condition. A circuit is coupled between the off-hook signal source and the subscriber telephone line which gradually increases the current drawn from the subscriber telephone line when the off-hook signal indicates an off-hook condition, and gradually decreases the current drawn from the subscriber telephone line when the off-hook signal indicates an on-hook condition.

By gradually increasing the current drawn from the subscriber telephone line when going off-hook and gradually decreasing the current drawn from the subscriber telephone line when going on-hook, the annoying clicks generated by prior art switch hook interface circuits are minimized or eliminated.

In the drawing

FIG. 1 is a schematic diagram of a circuit controlling the off-hook operation according to the present invention.

In FIG. 1, an off-hook signal input terminal, OH (i.e. OFF-HOOK), is coupled to an output terminal of a modem (not shown). In the embodiment illustrated in FIG. 1, this signal is active-low, as indicated by the line over "OH" in FIG. 1. That is, this signal is active when low, and inactive when high. The off-hook signal input terminal, OH, is coupled to respective first electrodes of a first resistor R1 and a second resistor R2. A second electrode of the second resistor R2 is coupled to a base electrode of a first NPN transistor T1. An emitter electrode of the first NPN transistor T1 is coupled to a source of a reference potential (ground). A collector electrode of the first NPN transistor T1 is coupled to respective first electrodes of a third resistor R3 and a fourth resistor R4. A second electrode of the fourth resistor is coupled to respective first electrodes of a first capacitor C1 and a fifth resistor R5. A second electrode of the fifth resistor R5 is coupled to an anode of a first diode D1. A cathode of the first diode D1 is coupled to a base electrode of a second NPN transistor T2. An emitter electrode of the second NPN transistor T2 is coupled to ground.

A source (not shown) of an operating voltage $V_{cc}$ is coupled to respective second electrodes of the first resistor R1 and the third electrode R3, and a first electrode of a sixth resistor R6. A second electrode of the sixth resistor R6 is coupled to an anode of a light emitting diode LED1, which is part of a solid state relay K1. A cathode of the light emitting diode LED1 is coupled to a collector electrode of the second NPN transistor T2.

An enable input terminal, ENB, is coupled to an output terminal of a source (not shown) of an slow off-hook enable signal. The enable input terminal, ENB, is coupled to a first electrode of a seventh resistor R7. A second electrode of the seventh resistor R7 is coupled to an anode of a second diode D2. A cathode of the second diode D2 is coupled to a base electrode of a third transistor T3. An emitter electrode of the third NPN transistor T3 is coupled to ground. A second electrode of the first capacitor C1 is coupled to a collector electrode of the third NPN transistor T3.

A first telephone line terminal, PH1, and a second telephone line terminal, PH2, are coupled to respective signal lines of a subscriber telephone line (not shown). Either of the first and second telephone line terminals, PH1 or PH2, respectively, may be coupled to the tip line, and the other coupled to the ring line of the subscriber telephone line. The first phone line terminal PH1 is coupled to an anode of a third diode D3 and a cathode of a fourth diode D4. A cathode of the third diode D3 is coupled to a collector of a photo-darlington pair PD1, which is also part of the solid state relay D1. An emitter electrode of the photo-darlington pair PD1 is coupled to a first terminal of a first winding of a wet modem transformer TR. A second terminal of the first winding of the transformer TR is coupled to respective anodes of the fourth diode D4 and the sixth diode D6. The second telephone line terminal PH2 is coupled to an anode of a fifth diode D5 and a cathode of a sixth diode D6. A cathode of the fifth diode D5 is coupled to the collector electrode of the photo-darlington pair PD1. The second winding of the transformer TR is coupled to the data transceiver circuitry of the modem (not shown).

In the illustrated embodiment, the solid state relay K1 includes a photo-darlington pair PD1 (as described above), which is a unidirectional device. This is much less expensive than other bidirectional switches, such as FETs. However, it is sensitive to the polarity of the tip and ring subscriber telephone line signals. To properly couple the subscriber telephone line signals to the photo-darlington pair PD1 in the solid state relay K1, the third, fourth, fifth and sixth diodes, D3, D4, D5 and D6, respectively, form a full-bridge, operating in a known manner, coupling the subscriber telephone line to the solid state relay K1.

In operation, a modem (not shown) controls the off-hook signal, OH, and control logic (also not shown) controls the slow enable signal, ENB. In its quiescent state, the modem is on-hook and the slow enable signal is disabled. Thus, the off-hook signal OH (active-low) is at $V_{cc}$, which in the illustrated embodiment is +5 volts, and the slow enable signal ENB (active high) is at ground potential. Thus, the first NPN transistor T1, operating as a switch, is on, and the third NPN transistor T3, also operating as a switch, is off.

Because the third NPN transistor T3 off, the capacitor C1 is floating and disconnected from the circuit. In its quiescent condition, it is discharged, and has zero volts across it. Because the first NPN transistor T1 is on, the base electrode of the second NPN transistor T2, which is biased in its active region to operate as an amplifier, is at ground potential and the second NPN transistor T2 is off. The light emitting diode LED1 is, thus, off, as is the photo-darlington pair PD1. Thus, the circuit remains on-hook.

When the modem is conditioned to begin an automatic connection to an external computer, the slow enable signal ENB is asserted, and goes to 5 volts. Because the enable signal ENB is high, the third NPN transistor T3 is turned on, which connects the second electrode of the capacitor C1 to ground. The capacitor C1 is now connected to the circuit. Then the modem goes off-hook to check whether the telephone line is free by detecting a dial tone. The off-hook signal, OH, is asserted, and the signal at the OH input terminal goes to ground. This turns off the first NPN transistor T1. The voltage across the capacitor C1 is initially zero, as described above, and the second NPN transistor T2 remains off. The capacitor C1 charges through the third and fourth resistors, R3 and R4, respectively. As the capacitor C1 charges, its voltage gradually rises. The gradual voltage increase across capacitor C1 gradually increases the base current of the second NPN transistor T2 and it enters the active region. The current through the main conduction (collector-emitter) path of the second NPN transistor T2, thus, also gradually increases. This, in turn, gradually increases the light output of the light emitting diode LED1, and this, in turn, gradually increases the current drawn through the photo-darlington pair PD1 from the subscriber phone line.

The capacitor C1 charges through the third and fourth resistors, R3 and R4, respectively, as described above, to $V_{cc}$, or 5 volts in the illustrated embodiment. When the capacitor C1 is fully charged to 1.8 volts, the transistor T2 reaches saturation and is fully on. At this point, the LED1 and the photo-darlington pair are fully on, and the modem is fully connected to the subscriber telephone line. At this point, other circuitry (not shown) attempts to detect a dial tone to determine if the modem is alone on the phone line.

In a preferred embodiment, the time constant of the third resistor R3, the fourth resistor R4 and the capacitor C1 are adjusted to provide a time period of approximately 300 milliseconds (ms) before full subscriber telephone line access for a loop current of 20 ma, and approximately 100 ms will elapse before full subscriber telephone line access for a loop current of 120 ma. In the preferred embodiment, the solid state relay K1 has a minimum gain of 10, and the current through LED1 is adjusted to be a maximum of 12 milliamperes (ma). This in turn can produce a current through the photo-darlington pair PD1 of 120 ma. with a voltage drop of 1.2 volts.

If a dial tone is detected, the modem is alone on the phone line, and it may begin the process of connecting to the external computer by dialing. If tone dialing is used then dialing proceeds normally. If no dial tone is detected, meaning that a subscriber is currently using the telephone line, or if the connection to the external computer is completed, then the modem goes on-hook again. In this case, the off-hook signal (active low) is negated and again becomes 5 volts. This causes the first NPN transistor T1 to turn on again. The capacitor C1 discharges through two paths: through the fourth resistor R4 and the first NPN transistor T1, and through the fifth resistor R5, the first diode D1 and the base-emitter path of the second NPN transistor T2.

As the capacitor C1 gradually discharges, as described above, the voltage across the capacitor C1 gradually decreases. This, in turn, gradually lowers the base current of the second NPN transistor T2, which gradually lowers the current through LED1 and, consequently, the photo-darlington pair PD1. The time constant for discharge of the capacitor C1 is slightly shorter than the time constant for charging the capacitor C1.

By gradually increasing the current drawn from the subscriber telephone line over a time period from 100 ms to 300 ms when going off-hook and gradually decreasing the current drawn from the subscriber telephone line over a similar time period when going on-hook again, the audible clicks generated by prior art phone interface circuits under these conditions are eliminated. A subscriber who is talking on the phone may hear a faint noise as the solid state relay K1 gradually goes off-hook and then back on-hook, and the additional load on the subscriber telephone line will cause the volume to drop by around 6 dB. However, the faint noise and drop in volume is, at worst, barely audible during normal conversation.

If tone dialing is used, the operation of this circuit is as described above. However, if pulse dialing is used, then the slow enable signal must be removed to permit the subscriber phone line to be pulsed appropriately. In this case the enable signal is negated, and goes to ground. The NPN transistor T3 is turned off by the negation of the enable signal. However, the capacitor C1 remains charged and has 5 volts across it. In order to perform the pulse dialing, the OH signal is pulsed off and on in a known manner. When the OH signal is pulsed off the first time, the first electrode of the capacitor C1 is coupled to ground through the fourth resistor R4 and the collector-emitter path of the first NPN transistor T1. The second electrode of the capacitor C1, consequently, has a voltage of −1.8 volts. This voltage forward biases the base-collector junction. This voltage is discharged to zero through the seventh resistor R7, the second diode D2 and the base-collector path of the third NPN transistor T3.

In the preferred embodiment, the solid state relay K1 has a minimum response time of substantially 300 microseconds ($\mu$s). This is faster than a standard armature mechanical relay, and a solid state relay has no contact points to burn. Thus, with the capacitor C1 disconnected from the circuit, the present circuit may be used for standard pulse dialing.

Circuitry according to the present invention can be used in an automatically controlled modem to go off-hook and on-hook without being audibly noticeable to a subscriber who may be using the telephone line at the same time. In addition, it uses less expensive parts than prior art switch hook interface circuits, and may be used for standard pulse dialing as well.

Table 1, below, provides preferred values for the components illustrated in FIG. 1.

TABLE I

| Comp. | Component Values Value Ω | Comp. | Value f. |
|---|---|---|---|
| R1 | 10k | C1 | 10$\mu$ |
| R2 | 100 | | |
| R3 | 4.7k | | |
| R4 | 15k | | |
| R5 | 4.7k | | |
| R6 | 300 | | |
| R7 | 4.7k | | |

What is claimed is:

1. A telephone switch hook interface circuit for coupling to a subscriber telephone line, comprising:
   a source of an off-hook signal, having a first state indicating an off-hook condition, and a second state indicating an on-hook condition; and
   a control circuit, coupled between the off-hook signal source and the subscriber telephone line, to gradually increase the current drawn from the subscriber telephone line from a minimum current to a maximum current when the off-hook signal indicates an off-hook condition, and gradually decrease the current drawn from the subscriber telephone line from the maximum current to the minimum current when the off-hook signal indicates an on-hook condition.

2. The interface circuit of claim 1 wherein the control circuit comprises:
   an amplifying circuit coupled to the subscriber telephone line, for varying the current drawn from the subscriber telephone line in response to a control signal; and
   a circuit for generating the control signal gradually increasing in response to the off-hook signal indicating an off-hook condition and gradually decreasing in response to the off-hook signal indicating the on-hook condition.

3. The interface circuit of claim 2 wherein the control signal generating circuit comprises a resistor and capacitor coupled to the off-hook signal source for gradually charging the capacitor in response to the off-hook signal indicating an off-hook condition and gradually discharging the capacitor in response to the off-hook signal indicating an on-hook condition and using a voltage across the capacitor as the control signal.

4. The interface circuit of claim 1 wherein the off-hook signal source comprises a modem.

5. The interface circuit of claim 1 wherein the increase of current from the minimum current to the maximum current, and from the maximum current to the minimum current occurs substantially between 100 and 300 milliseconds.

6. The interface circuit of claim 1 wherein the minimum current is substantially 0 milliamperes.

7. The interface circuit of claim 1 wherein the maximum current is substantially between 10 milliamperes and 120 milliamperes.

8. A telephone switch hook interface circuit for coupling to a subscriber telephone line, comprising:
   a source of an off-hook signal, having a first state indicating an off-hook condition and a second state indicating an on-hook condition; and
   a control circuit, coupled between the off-hook signal source and the subscriber telephone line, to gradually increase the current drawn from the subscriber telephone line from a minimum current to a maximum current when the off-hook signal indicates an off-hook condition, and gradually decrease the current drawn from the subscriber telephone line from the maximum current to the minimum current when the off-hook signal indicates an on-hook condition and wherein:
   the interface circuit further comprises a source of an enable signal having a first state indicating that the control circuit is to be enabled, and a second state indicating that the control circuit is to be disabled;
   the control circuit operates in one of an enabled and a disabled state, in response to the state of the enable signal, wherein:
      in the enabled state the control circuit gradually increases the current drawn from the subscriber telephone line from the minimum current to the maximum current when the off-hook signal indicates an off-hook condition, and gradually decreases the current drawn from the subscriber telephone line from the maximum current to the minimum current when the off-hook signal indicates an on-hook condition; and
      in a disabled state the control circuit switches the current drawn from the subscriber telephone line from the minimum current to the maximum current when the off-hook signal indicates an off-hook condition and switches the current drawn from the subscriber telephone line from the maximum current to the minimum current when the off-hook signal indicates an on-hook condition.

9. A telephone switch hook interface circuit for coupling to a subscriber telephone line, comprising:
   a source of an off-hook signal, having a first state indicating an off-hook condition and a second state indicating an on-hook condition; and
   a control circuit, coupled between the off-hook signal source and the subscriber telephone line, to gradually increase the current drawn from the subscriber telephone line from a minus current to a maximum current when the off-hook signal indicates an off-hook condition, and gradually decrease the current drawn from the subscriber telephone line from the maximum current to the minimum current when the off-hook signal indicates an on-hook condition and wherein the control circuit comprises:
   an amplifying circuit coupled to the subscriber telephone line, for varying the current drawn from the subscriber telephone line in response to a control signal; and
   a circuit for generating the control signal for controlling the amplifying circuit to gradually increase the current drawn from the subscriber telephone line in response to the off-hook signal indicating an off-hook condition and for controlling the amplifying circuit to gradually decrease the current drawn from the subscriber telephone line in response to the off-hook signal indicating an on-hook condition; and wherein:
      the amplifying circuit comprises a serial connection of a solid state relay and a main conduction path of a transistor, biased to operate as an amplifier, coupled between a source of operating potential and a source of reference potential; and
      the control signal generating means is coupled to a control electrode of the transistor.

10. The interface circuit of claim 9 wherein the solid state relay comprises a light emitting diode coupled between the operating potential source and the transistor, and a photo-darlington pair coupled to the subscriber telephone line.

11. The interface circuit of claim 10 wherein the amplifying circuit further comprises a full bridge coupled between the subscriber telephone line and the photo-darlington pair.

12. A telephone switch hook interface circuit for coupling to a subscriber telephone line, comprising:
   a source of an off-hook signal, having a first state indicating an off-hook condition and a second state indicating an on-hook condition; and
   a control circuit, coupled between the off-hook signal source and the subscriber telephone line, to gradually increase the current drawn from the subscriber telephone line from a minimum current to a maximum current when the off-hook signal indicates an off-hook condition, and gradually decrease the current drawn from the subscriber telephone line from the maximum current to the minimum current when the off-hook signal indicates an on-hook condition and wherein the control circuit comprises:

an amplifying circuit coupled to the subscriber telephone line, for varying the current drawn from the subscriber telephone line in response to a control signal; and a circuit for generating the control signal for controlling the amplifying circuit to gradually increase the current drawn from the subscriber telephone line in response to the off-hook signal indicating an off-hook condition and for controlling the amplifying circuit to gradually decrease the current drawn from the subscriber telephone line in response to the off-hook signal indicating an on-hook condition; and wherein:

the control signal generating circuit comprises a resistor and capacitor coupled to the off-hook signal source for gradually charging the capacitor in response to the off-hook signal indicating an off-hook condition and gradually discharging the capacitor in response to the off-hook signal indicating an on-hook condition and using a voltage across the capacitor as the control signal; and wherein the control signal generating circuit further comprises:

a serial connection of the resistor and the capacitor having a first and second terminal, wherein the first terminal of the serial connection is coupled to a source of reference potential; and a switch, for selectively coupling the second terminal of the serial connection to the source of reference potential in response to the off-hook signal indicating an on-hook condition and to a source of operating potential in response to the off-hook signal indicating an off-hook condition.

13. The interface circuit of claim 12 wherein:

the interface circuit further comprises a source of an enable signal having a first state indicating that the control circuit is to be enabled, and a second state indicating that the control circuit is to be disabled; and the control signal generating circuit further comprises a second switch, for selectively coupling the first terminal of the serial connection to the source of reference potential in response to the enable signal indicating the control circuit is to be enabled, and isolating the first terminal of the serial connection from the source of reference potential in response to the enable signal indicating the control circuit is to be disabled.

\* \* \* \* \*